US007724411B2

(12) United States Patent
Ko et al.

(10) Patent No.: US 7,724,411 B2
(45) Date of Patent: May 25, 2010

(54) 2-AXIS DRIVING ELECTROMAGNETIC SCANNER

(75) Inventors: Young-chul Ko, Yongin-si (KR); Jun-o Kim, Yongin-si (KR); Jin-woo Cho, Seongnam-si (KR); Hee-moon Jeong, Yongin-si (KR); Woo-hyek Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 246 days.

(21) Appl. No.: 12/045,722

(22) Filed: Mar. 11, 2008

(65) Prior Publication Data

US 2009/0080049 A1 Mar. 26, 2009

(30) Foreign Application Priority Data

Sep. 21, 2007 (KR) ................ 10-2007-0096947

(51) Int. Cl.
*G02B 26/08* (2006.01)

(52) U.S. Cl. .............. 359/224.1; 359/198.1; 359/199.3; 359/200.7; 310/36; 310/46

(58) Field of Classification Search ... 359/198.1–199.1, 359/199.3, 200.7, 224.1
See application file for complete search history.

(56) References Cited

U.S. PATENT DOCUMENTS

| 2005/0036187 | A1 | 2/2005 | Sugawara |
| 2005/0200938 | A1 | 9/2005 | Greywall |
| 2005/0253055 | A1 | 11/2005 | Sprague et al. |
| 2006/0208607 | A1 | 9/2006 | Yoon et al. |
| 2007/0139752 | A1 | 6/2007 | Bernstein et al. |

FOREIGN PATENT DOCUMENTS

| JP | 07-027989 A | 1/1995 |
| JP | 2005-250078 A | 9/2005 |

*Primary Examiner*—James Phan
(74) *Attorney, Agent, or Firm*—Sughrue Mion, PLLC

(57) ABSTRACT

A 2-axis driving electromagnetic scanner, having a structure in which a mirror is separated from a driving unit and directly driven, is provided. The electromagnetic scanner includes: an outer driving unit which is capable of rotating around a first axis; an inner driving unit which is suspended from the outer driving unit so as to rotate around a second axis perpendicular to the first axis; and a stage which is located on an upper surface of the inner driving unit so as to rotate together with the inner driving unit. In the electromagnetic scanner, the stage is connected to the inner driving unit by a link unit protruding from a center of a lower surface of the stage.

16 Claims, 9 Drawing Sheets

2-AXIS DRIVING ELECTROMAGNETIC SCANNER

CROSS-REFERENCE TO RELATED PATENT APPLICATION

This application claims priority from Korean Patent Application No. 10-2007-0096947, filed on Sep. 21, 2007, in the Korean Intellectual Property Office, the disclosure of which is incorporated herein in its entirety by reference.

BACKGROUND OF THE INVENTION

1. Field of the Invention

Apparatuses consistent with the present invention relate to a 2-axis driving electromagnetic scanner, and more particularly, to a 2-axis driving electromagnetic scanner in which a mirror is separated from a driving unit and directly driven.

2. Description of the Related Art

Recently, a micro electromagnetic scanner having a microscopic structure manufactured by a micro-electro-mechanical system (MEMS) has been actively researched in various technical fields such as in the fields of image display devices, laser printers, accurate measurement systems, accurate fabrication systems, and the like.

A 2-axis driving electromagnetic scanner, which is driven by an electromagnetic force that is exerted by a coil in a magnetic field, horizontally and vertically scans incident light on a predetermined screen area by vibrating a mirror surface with respect to different oscillation axes. For example, a change in a horizontal scanning angle of the 2-axis driving electromagnetic scanner is represented as a high-frequency sinusoidal function. On the other hand, a change in a vertical scanning angle of the 2-axis driving electromagnetic scanner is represented as a low-frequency sawtooth function. Specifically, in order to project an image by using the 2-axis driving electromagnetic scanner, the mirror may be non-resonantly driven according to a sawtooth waveform at a frequency of about 60 Hz with respect to a horizontal oscillation axis and resonantly driven according to a sine wave at a frequency of about 20 kHz, that is a relatively high frequency, with respect to a vertical oscillation axis.

Various techniques for embodying the 2-axis driving electromagnetic scanner have been suggested. For example, a first coil is formed in the mirror, and a second coil is formed in a frame for supporting the mirror. Then, a sine wave at a frequency of 20 kHz, which is a horizontal signal, and a sawtooth wave at a frequency of 60 Hz, which is a vertical signal, are independently applied respectively to the first and second coils. However, in this case, since the first coil is directly formed in the mirror, the mirror is deformed due to a difference between thermal expansion coefficients of the coil and the mirror.

In another example, only a single coil is formed in a frame for supporting a mirror, and a composite signal obtained by combining a sine wave at a frequency of 20 kHz, which is a horizontal scanning signal, and a sawtooth wave at a frequency of 60 Hz, which is a vertical scanning signal, is applied to the coil. In this example, since the vertical driving force and the horizontal driving force are applied to the frame, the mirror is indirectly driven by the horizontal driving force acting on the frame. However, in this example, there is a problem in that there is minute horizontal vibration (horizontal noise) at a frequency of 20 kHz in the vertically driven frame. There is also a limitation in terms of embodying a scanner with high resolution due to horizontal noise. Furthermore, in the case of a resonant driving method in the horizontal direction, since the resonant driving method is an indirect driving method using the driving force of the frame, power consumption increases.

In another example, a coil for a horizontal scan signal and a coil for a vertical scan signal are alternately formed in the frame for supporting the mirror. However, in this example, since the vertical driving force and the horizontal driving force are applied to the frame, the mirror is indirectly driven by the horizontal driving force acting on the frame. Accordingly, horizontal noise occurs in the frame. In addition, since the coils are alternately used, the amount of current needed to drive the mirror is large. Accordingly, power consumption significantly increases.

SUMMARY OF THE INVENTION

Exemplary embodiments of the present invention provide a 2-axis driving electromagnetic scanner capable of directly driving a mirror while preventing deformation of the mirror.

Exemplary embodiments of the present invention also provide a 2-axis driving electromagnetic scanner capable of improving resolution and reducing power consumption by preventing noise.

According to an aspect of the present invention, there is provided an electromagnetic scanner including an outer driving unit which is rotatable around a first axis; an inner driving unit which is suspended from the outer driving unit, such that it is rotatable around a second axis perpendicular to the first axis; and a stage which is located on an upper surface of the inner driving unit, such that it is rotatable together with the inner driving unit. The stage may be connected to the inner driving unit by a link unit protruding from a center of a lower surface of the stage.

The electromagnetic scanner may further include an outer driving coil which is located under a lower surface of the outer driving unit, which receives a first signal, for rotating the outer driving unit around the first axis; and an inner driving coil which is located under a lower surface of the inner driving unit, which receives a second signal, for rotating the inner driving unit around the second axis.

A low frequency non-resonant signal may be applied to the outer driving coil, and a high frequency resonant signal may be applied to the inner driving coil.

The low frequency non-resonant signal may be a sawtooth signal, and the high frequency resonant signal may be a sinusoidal signal.

The electromagnetic scanner may further include a frame rotatably supporting the outer driving unit.

The outer driving unit may be suspended from the frame by first torsion springs extending in the first axis direction.

The inner driving unit may be suspended in the outer driving unit by second torsion springs extending in the second axis direction.

The outer and inner driving units may be ring-shaped.

The link unit may be connected to the inner driving unit by connection beams.

The connection beams may connect a lower part of the link unit to an inner surface of the inner driving unit.

The connection beams may be mechanical filter springs.

The connection beams may be formed in parallel with the first axis direction.

The link unit may have a circular cross-sectional area.

In order to prevent deformation of the stage, the scanner may further include protrusion units formed along two sides of the link unit in a butterfly formation.

In order to reduce a moment of inertia, the scanner may further include grooves formed along upper surfaces of the outer and inner driving units.

The scanner may further include a mirror surface formed on an upper surface of the stage.

BRIEF DESCRIPTION OF THE DRAWINGS

The above and other exemplary aspects and advantages of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, 2-axis driving electromagnetic scanners according to exemplary embodiments of the present invention will be described in detail with reference to the accompanying drawings.

Figure 1:
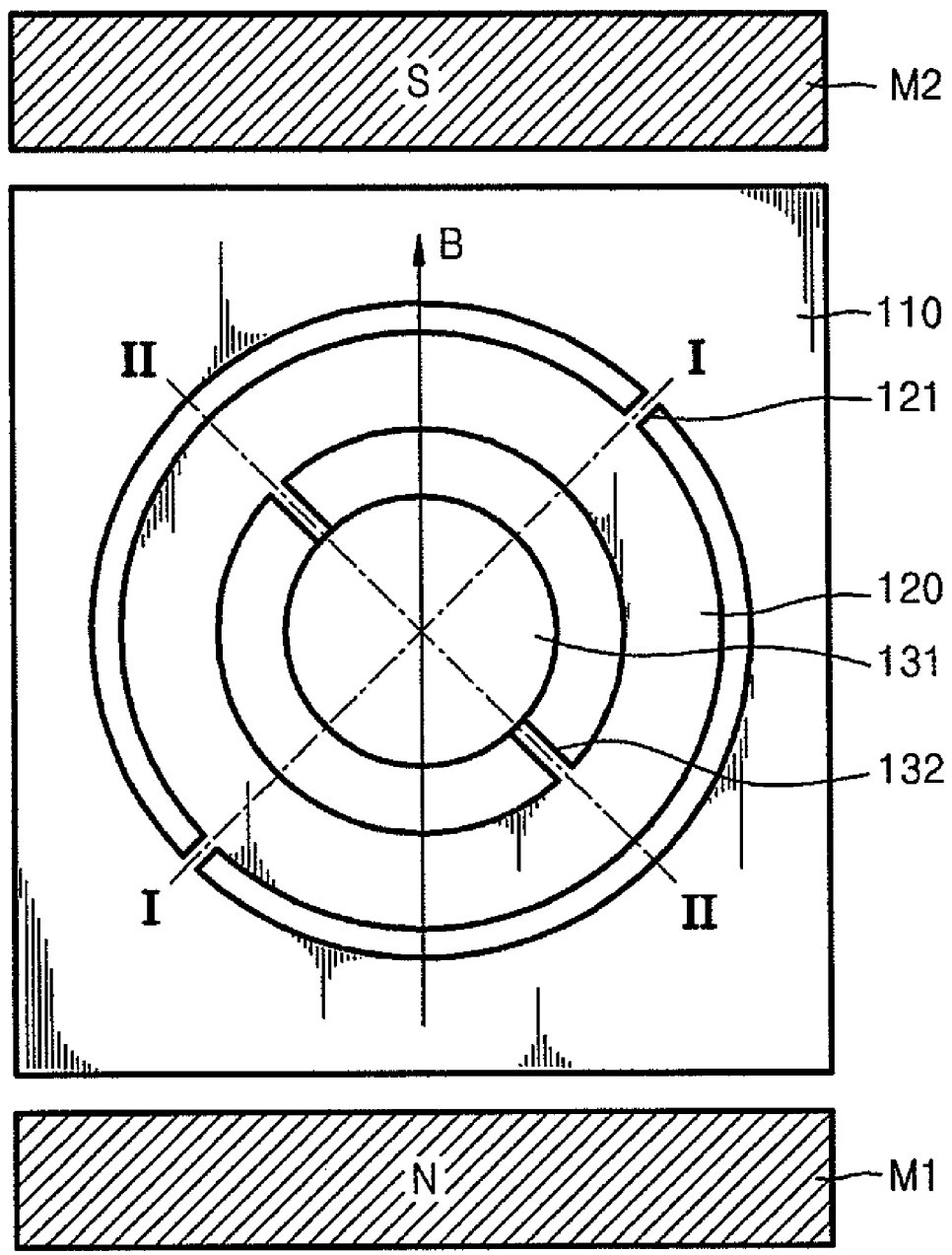
FIG. 1 is a schematic top plan view illustrating a top structure of a 2-axis driving electromagnetic scanner according to an exemplary embodiment of the present invention.
Figure 2:
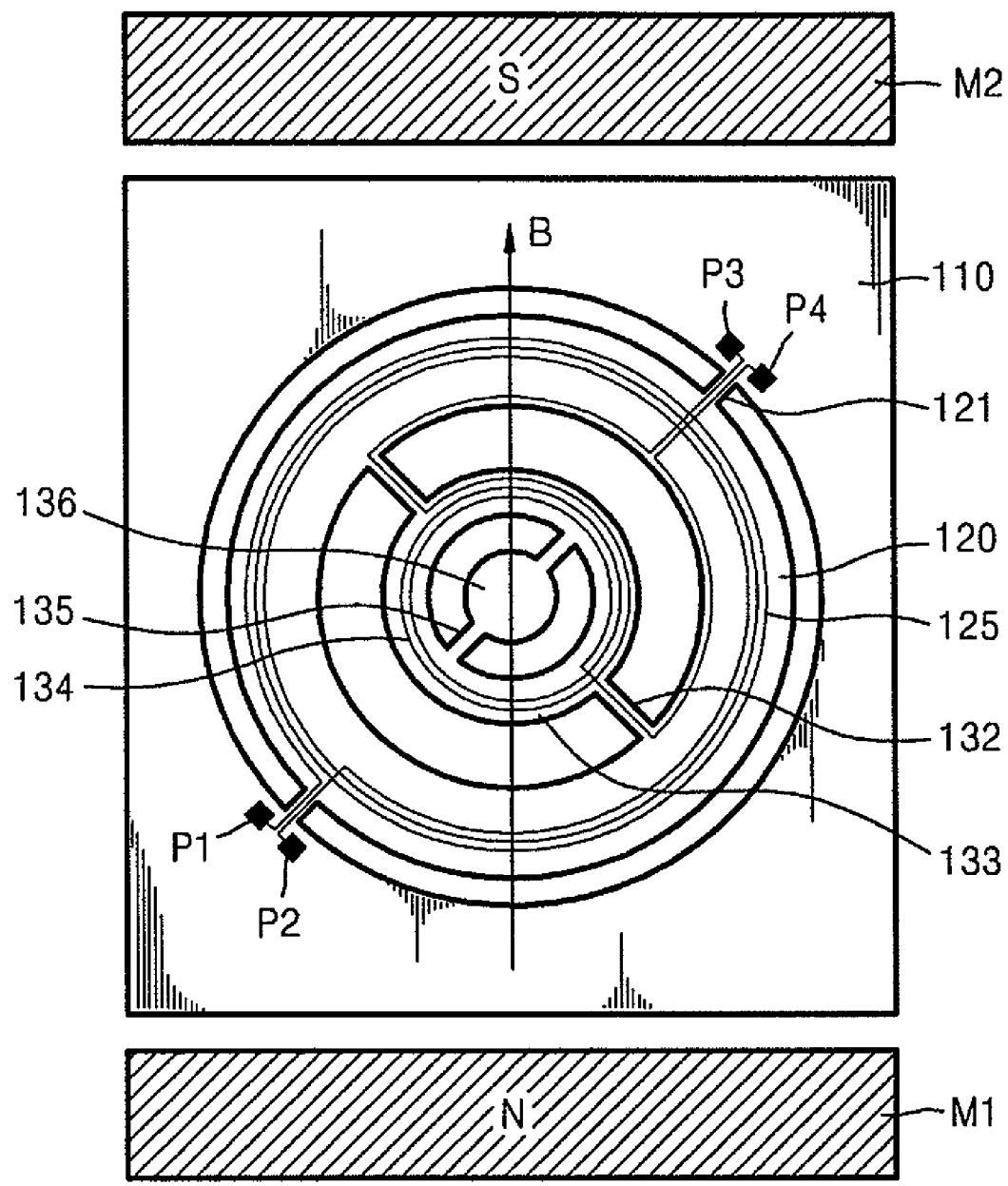
FIG. 2 is a schematic bottom plan view illustrating a bottom structure of the 2-axis driving electromagnetic scanner according to an exemplary embodiment of the present invention.

FIG. 1 is a schematic top plan view illustrating a top structure of a 2-axis driving electromagnetic scanner 100 according to an embodiment of the present invention. FIG. 2 is a schematic bottom plan view illustrating a bottom structure of the 2-axis driving electromagnetic scanner 100. Referring to FIGS. 1 and 2, the 2-axis electromagnetic scanner 100 according to the present embodiment includes an outer driving unit 120 capable of rotating around a first axis, a frame 110 for supporting the outer driving unit 120, an inner driving unit 133 capable of rotating around a second axis perpendicular to the first axis, and a stage 131 rotating together with the inner driving unit 133.

In addition, first and second magnets M1 and M2 for generating a homogeneous magnetic field in a direction between the first and second axes may be respectively arranged on both sides of the frame 110. For example, a north (N) pole of the first magnet M1 is arranged so as to face the frame 110 at one side thereof. A south (S) pole of the second magnet M2 is arranged so as to face the frame 110 at another side thereof, opposite the side of the north (N) pole. The first and second magnets M1 and M2 may be permanent magnets or electromagnets.

The outer driving unit 120 is suspended from the frame 110 by using first torsion springs 121 formed in both sides of the outer driving unit 120 in the first axis direction (the direction of line I-I). Accordingly, the outer driving unit 120 can rotate around the first torsion springs 121 with respect to the first axis direction while being supported by the frame 110. In the present invention, the outer driving unit 120 has a hollow ring shape. Although the outer driving unit 120 is shown as having a circular ring shape in the drawings, the outer driving unit 120 may have a rectangular ring or polygonal ring shape.

In addition, referring to FIG. 2, an outer driving coil 125 for rotating the outer driving unit 120 around the first axis is formed under the lower surface of the outer driving unit 120. For example, an end of the outer driving coil 125 is connected to a first electrode pad P1, formed under the lower surface of the frame 110, through the first torsion spring 121. The outer driving coil 125 is wound several times or tens of times under the lower surface of the outer driving unit 120. The other end of the outer driving coil 125 is connected to a second electrode pad P2 formed under the lower surface of the frame 110. A first signal for driving the outer driving unit 120 is applied to the outer driving coil 125. When the first signal is applied to the outer driving coil 125, it is possible to drive the outer driving unit 120 by using the Lorentz force generated by a magnetic field B generated by the first and second magnets M1 and M2 and a current flowing through the outer driving coil 125.

In a case where the outer driving unit 120 is vertically driven, the first signal applied to the outer driving coil 125 may be a low frequency non-resonant signal at a frequency of about 60 Hz. The outer driving unit 120 and the first torsion springs 121 may be designed to have a mass and an elastic stiffness which are sufficient for low frequency vibration. Here, the non-resonant signal indicates a signal which has a frequency that is different from the natural frequency (resonance frequency) of the outer driving unit 120. In this case, the outer driving unit 120 non-resonantly rotates due to the first signal applied to the outer driving coil 125. Specifically, when the outer driving unit 120 is used for a vertical scanning process of an image display device, the first signal may be a low frequency non-resonant signal having a sawtooth waveform.

Figure 3:
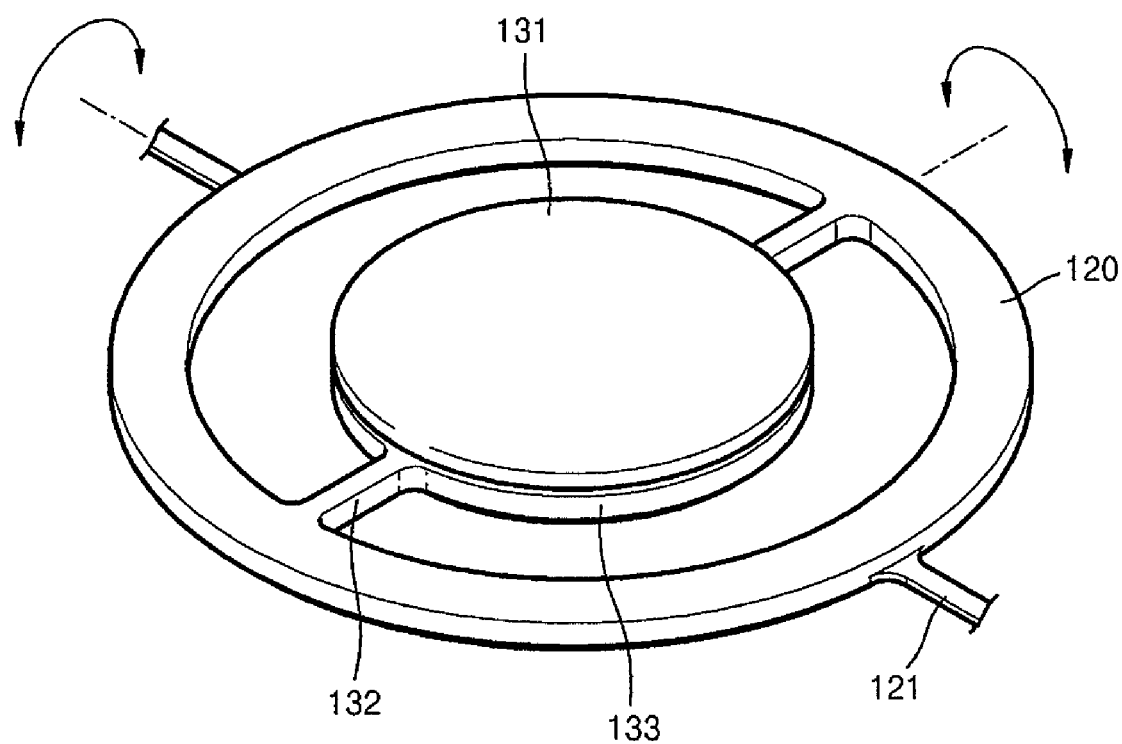
FIG. 3 is a schematic perspective view illustrating outer and inner driving units of the 2-axis driving electromagnetic scanner shown in FIG. 1.

On the other hand, a stage 131 and an inner driving unit 133 are arranged in the outer driving unit 120. As clearly shown in a perspective view illustrated in FIG. 3, only the inner driving unit 133 is directly connected to the outer driving unit 120. The stage 131 is located on the upper surface of the inner driving unit 133. The inner driving unit 133 is suspended from the outer driving unit 120 through second torsion springs 132 formed in both sides of the inner driving unit 133 in the second axis direction (the direction of line II-II). Accordingly, the inner driving unit 133 can rotate around the second torsion springs 132 with respect to the second axis direction while being supported by the outer driving unit 120. Here, the first and second axis directions are perpendicular to each other, though this is not required by the present invention. Accordingly, extension lines of the first and second springs 121 and 132 are also perpendicular to each other.

Referring to FIG. 2, the inner driving unit 133 also has a hollow ring shape. Although the inner driving unit 133 is shown as having a circular ring shape in the drawings, the inner driving unit 133 may have a rectangular ring or polygonal ring shape. An inner driving coil 134 for rotating the inner driving unit 133 around the second axis is formed under the lower surface of the inner driving unit 133. For example, an end of the inner driving coil 134 is connected to a third electrode pad P3 formed under the lower surface of the frame 110, through the first and second torsion springs 121 and 132. The inner driving coil 134 is wound several times or tens of times under the lower surface of the inner driving unit 133. The other end of the inner driving coil 134 is connected to a fourth electrode pad P4 formed under the lower surface of the frame 110. A second signal for driving the inner driving unit 133 is applied to the inner driving coil 134. When the second signal is applied to the inner driving coil 134, it is possible to drive the inner driving unit 133 by using the Lorentz force generated by a magnetic field B generated by the first and second magnets M1 and M2 and a current flowing through the inner driving coil 134.

In a case where the inner driving unit 133 is horizontally driven, the second signal applied to the inner driving coil 134 may be a high frequency resonant signal of about 20 kHz. The inner driving unit 133 and the second torsion springs 132 may be designed to have a mass and an elastic stiffness which are sufficient for high frequency vibration. For example, the inner driving unit 133 and the second torsion springs 132 may be designed so that the natural frequencies of the inner driving unit 133 and the second torsion springs 132 are about 20 kHz, which is the frequency of the second signal. In this case, the inner driving unit 133 resonantly rotates due to the second signal applied to the inner driving coil 134. Specifically, when the inner driving unit 133 is used for a horizontal scanning process of an image display device, the second signal may be a low frequency resonant signal having a sinusoidal waveform.

A mirror surface for deflection scanning of light may be formed on the stage 131 of the 2-axis driving electromagnetic scanner 100 according to an embodiment of the present invention. Since the stage 131 is connected to the inner driving unit 133, the stage 131 rotates around the second axis together with the inner driving unit 133. The stage 131 is connected to the inner driving unit 133 by a link unit 136 protruding from the center of the lower surface of the stage 131. In addition, the link unit 136 is not directly connected to the inner driving unit 133 but connected to the inner driving unit 133 by connection beams 135.

Figure 4:
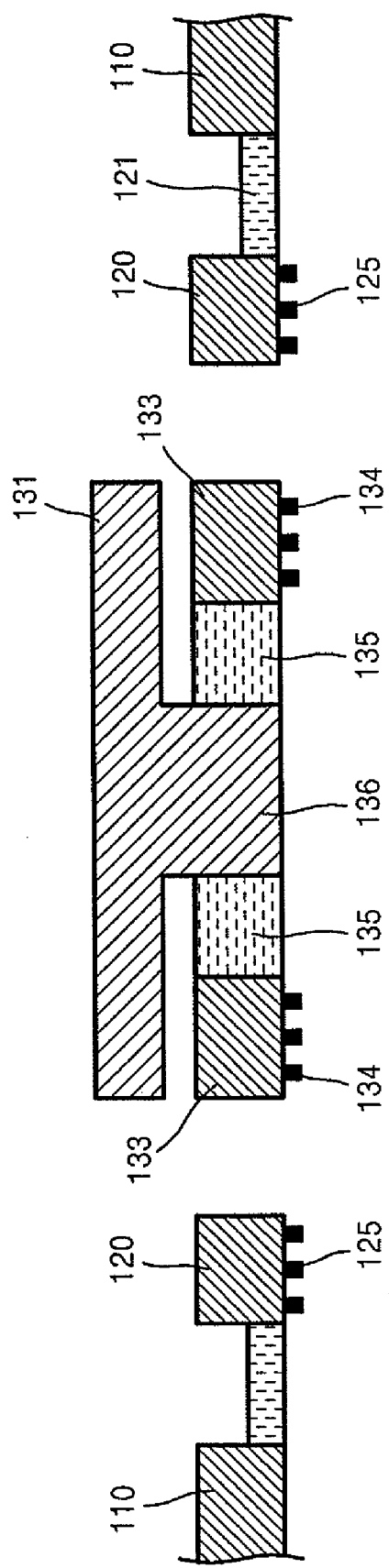
FIG. 4 is a schematic cross-sectional view illustrating the 2-axis driving electromagnetic scanner taken along a line I-I of FIG. 1.
Figure 5:
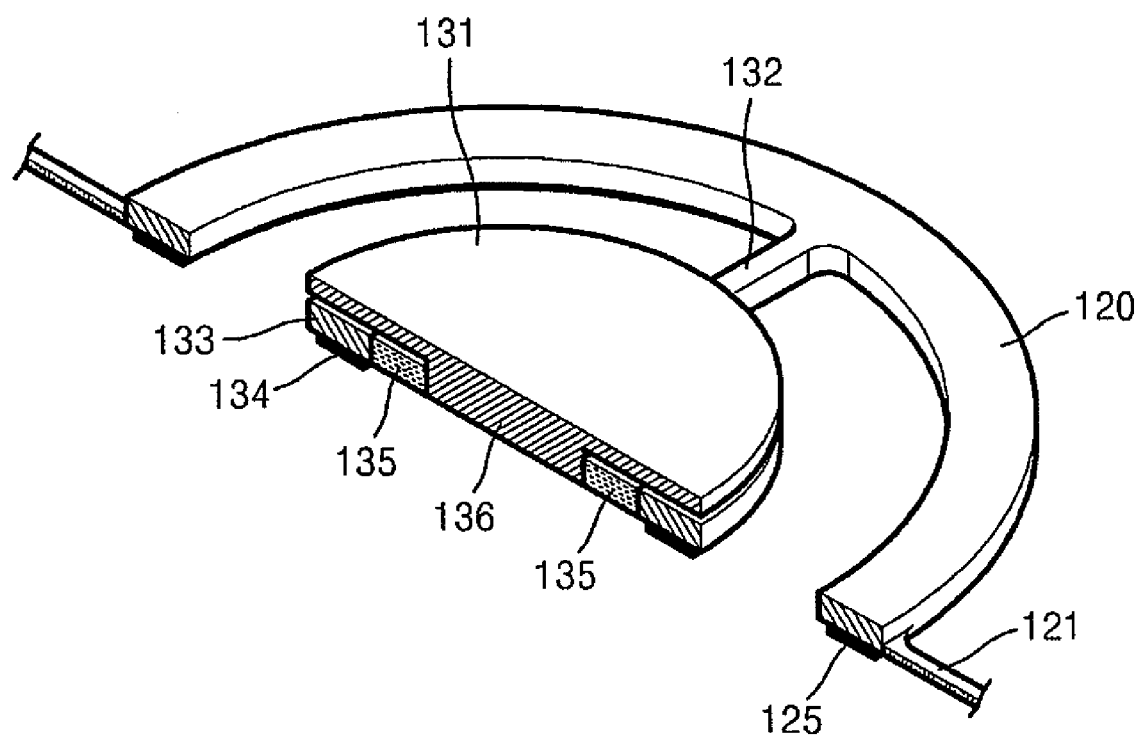
FIG. 5 is a schematic perspective view illustrating the cross section of the 2-axis driving electromagnetic scanner shown in FIG. 4.
Figure 6:
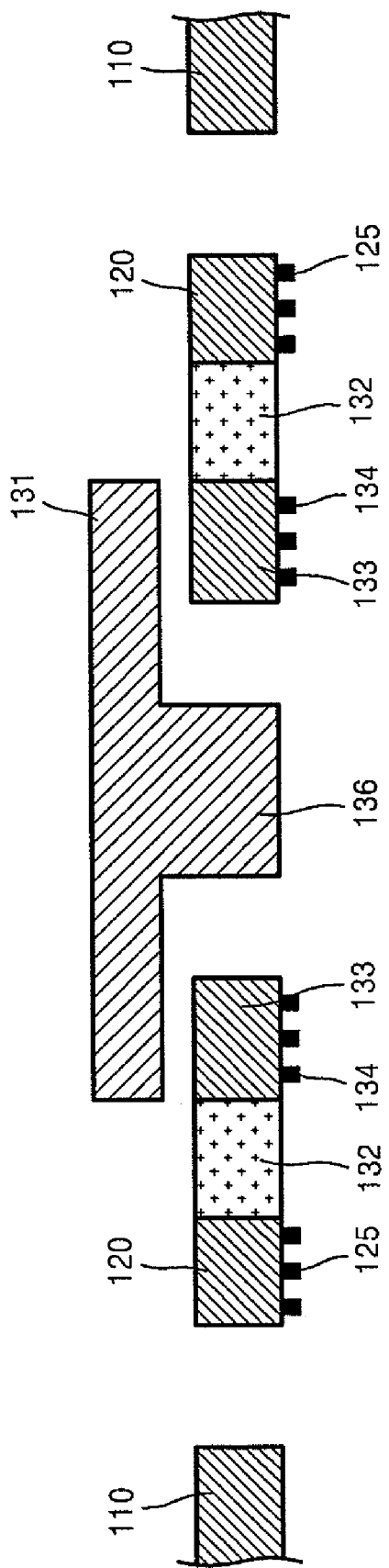
FIG. 6 is a schematic cross-sectional view illustrating the 2-axis driving electromagnetic scanner taken along a line II-II of FIG. 1.
Figure 7:
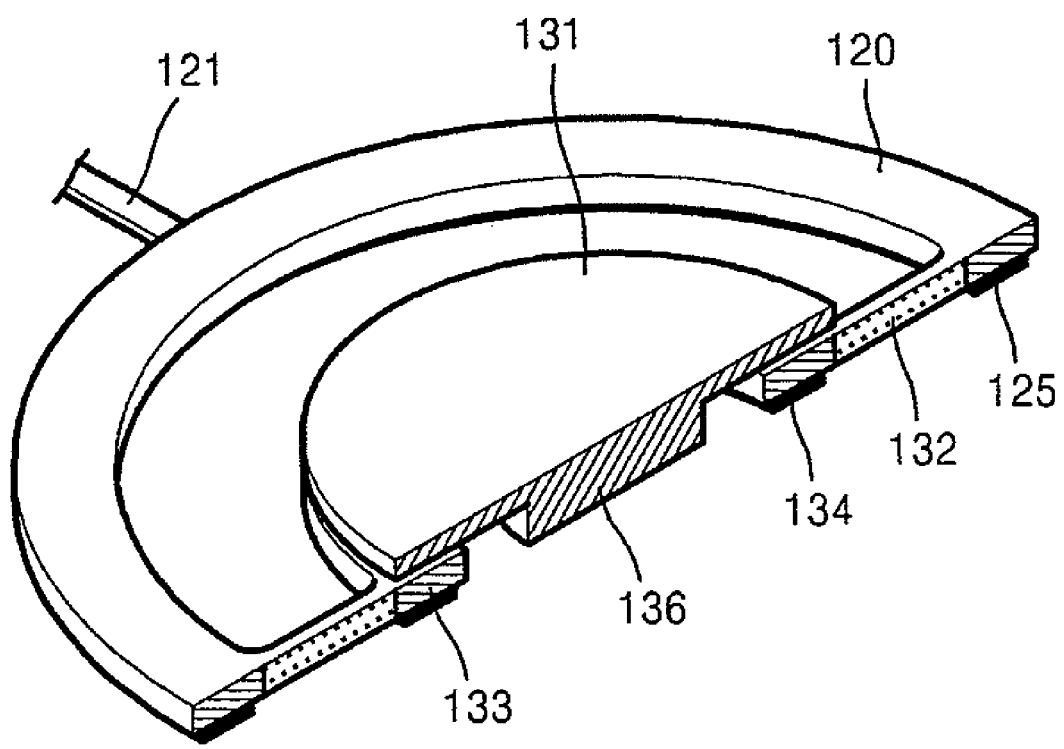
FIG. 7 is a schematic perspective view illustrating the cross section of the 2-axis driving electromagnetic scanner shown in FIG. 6.

The connection relation among the stage 131, the inner driving unit 133, the link unit 136, and the connection beams 135 are more clearly shown in FIGS. 4 to 7. FIG. 4 is a schematic cross-sectional view illustrating the 2-axis driving electromagnetic scanner 100 taken substantially along a line I-I (the first axis direction) of FIG. 1. FIG. 5 is a schematic perspective view illustrating the cross section of the 2-axis driving electromagnetic scanner 100 shown in FIG. 4. FIG. 6 is a schematic cross-sectional view illustrating the 2-axis driving electromagnetic scanner 100 taken along a line II-II (the second axis direction) of FIG. 1. FIG. 7 is a schematic perspective view illustrating the cross section of the 2-axis driving electromagnetic scanner 100 shown in FIG. 6.

Referring to FIGS. 4 to 7, the outer driving unit 120 having a ring shape is rotatably supported by the frame 110 through the first torsion springs 121. The outer driving coil 125 is located under the lower surface of the outer driving unit 120. In addition, the inner driving unit 133 having a ring shape is rotatably supported by the outer driving unit 120 by the second torsion springs 132 perpendicular to the first torsion springs 121. The inner driving coil 134 is located under the lower surface of the inner driving unit 133. The stage 131 having a disk shape is located on an upper surface of the inner driving unit 133. The upper part of the link unit 136 having a cylindrical shape is connected to a center of a lower surface of the stage 131. The lower part of the link unit 136 is located in the inner driving unit 133 having the ring shape. The connection beams 135 connect the lower part of the link unit 136 to the inner driving unit 133. For example, the connection beams 135 connect the lower part of the link unit 136 to the inner surface of the inner driving unit 133.

In an embodiment of the present invention, the stage 131 on which the mirror surface is formed is separated from the inner driving unit 133 by inserting the link unit 136 therebetween. As a result, when directly driving the inner driving unit 133 by installing a coil under the inner driving unit 133, the mirror surface formed on the upper surface of the stage 131 is not deformed. Accordingly, it is possible to horizontally and resonantly drive the stage 131 at a high frequency without deforming the mirror surface during low power consumption.

In addition, in an embodiment of the present invention, the connection beams 135 inserted between the lower part of the link unit 136 and the inner surface of the inner driving unit 133 serves as mechanical filter springs. The connection beams 135 may be formed in parallel with the first axis direction. That is, the connection beams 135 are located on the extension line of the first torsion springs 121. The connection beams 135 are perpendicular to the extension line of the second torsion springs 132. Accordingly, since the link unit 136 is indirectly connected to the inner driving unit 133 through the connection beams 135, it is possible to remove high frequency noise generated in the inner driving unit 133. Accordingly, since transmission of the noise between the stage 131 and the outer driving unit 120 is suppressed, it is possible to obtain a high resolution.

Figure 8:
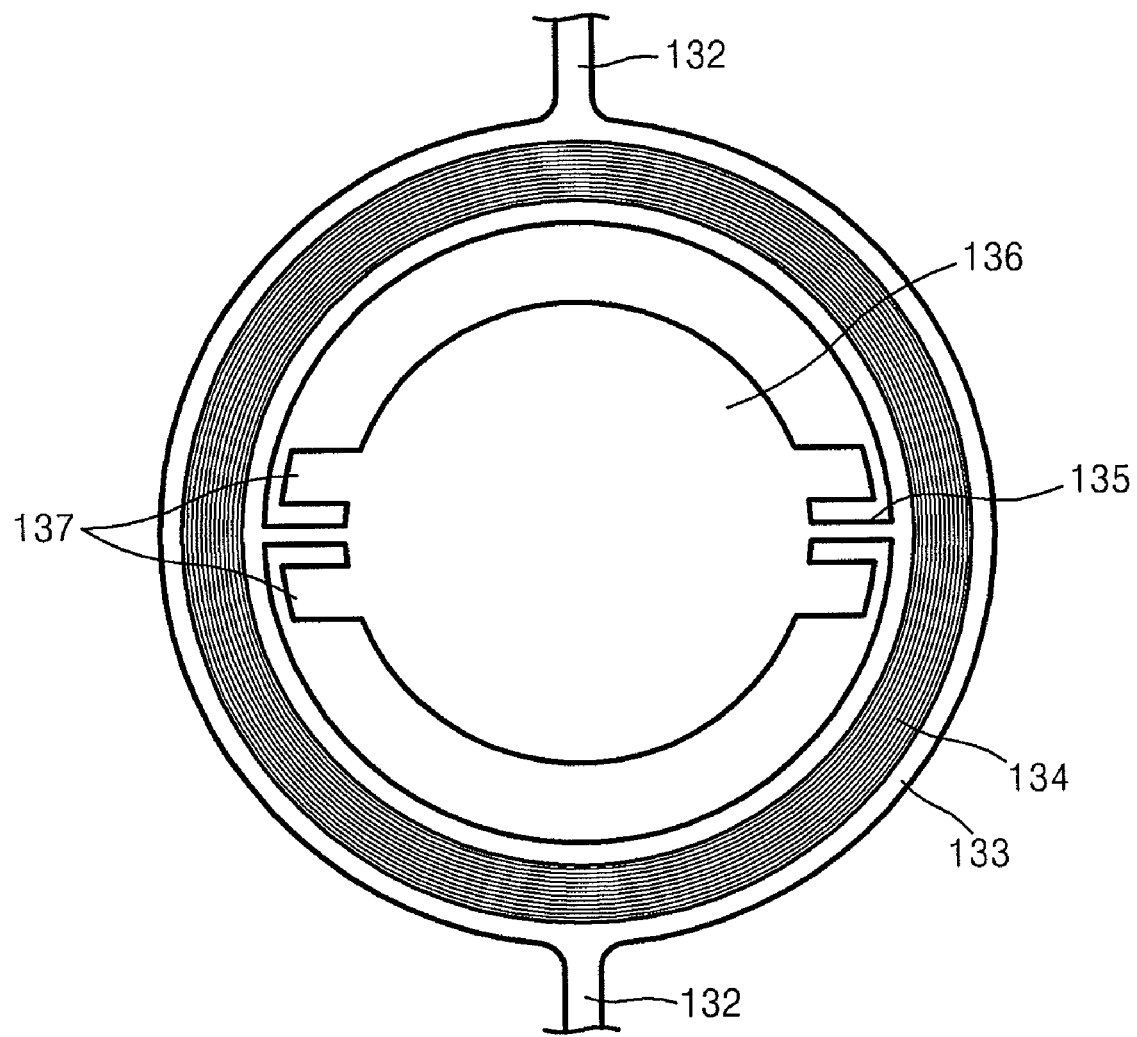
FIG. 8 is an example of a cross-sectional view illustrating a link unit of a 2-axis driving electromagnetic scanner according to another exemplary embodiment of the present invention.

FIG. 8 is an example of a cross-sectional view illustrating a link unit 136 of a 2-axis driving electromagnetic scanner 100 according to another embodiment of the present invention. In the embodiment shown in FIG. 2, the link unit 136 has a circular cross section. In this case, the stage 131 may be deformed at a part connecting the stage 131 and the link unit 136. In order to prevent the deformation of the stage 131, as shown in FIG. 8, protrusion units 137 may be formed along both sides of the link unit 136. For example, two parallel protrusion units 137 may be symmetrically formed on both sides of the link unit in a butterfly formation. Then, the deformation of the stage 131 is suppressed at the part connecting the stage 131 and the link unit 136.

Figure 9:
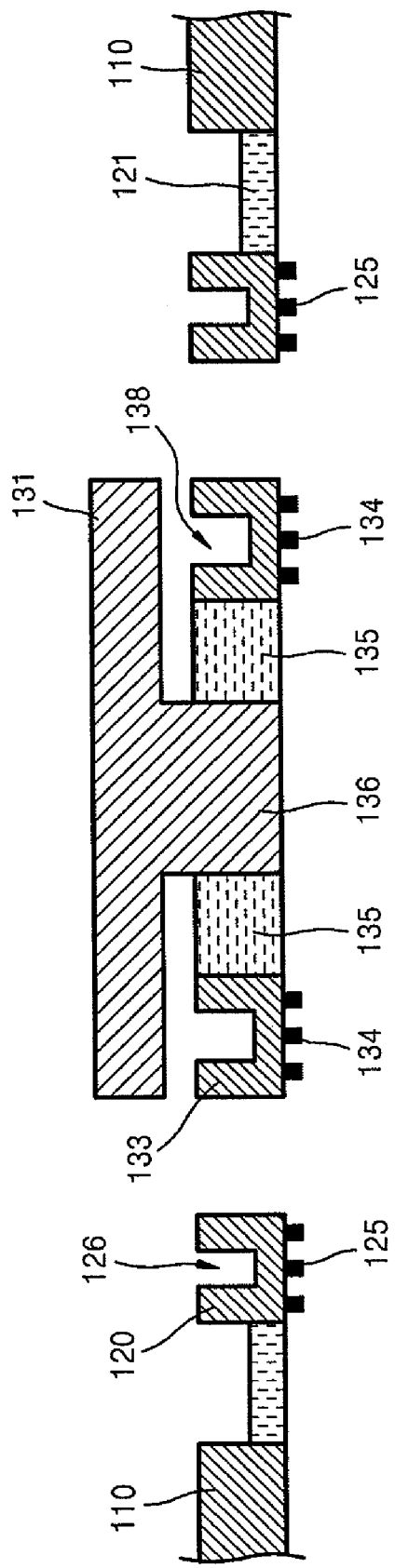
FIG. 9 is a schematic cross-sectional view illustrating a structure of a 2-axis driving electromagnetic scanner according to another exemplary embodiment of the present invention.

FIG. 9 is a cross-sectional view schematically illustrating a structure of a 2-axis driving electromagnetic scanner 100 according to another embodiment of the present invention. Referring to FIG. 9, grooves 126 and 138 are formed respectively along the upper surfaces of the outer and inner driving units 120 and 133. The grooves 126 and 138 may reduce masses of the outer and inner driving units 120 and 133, respectively. Accordingly, it is possible to reduce the power consumption for driving the outer and inner driving units 120 and 133. In addition, moments of inertia of the outer and inner driving units 120 and 133 are largely reduced due to the reduction of the masses of the outer and inner driving units 120 and 133. As a result, reaction times of the outer and inner driving units 120 and 133 decrease. Accordingly, it is possible to speedily and accurately control an operation.

In the present invention, it is possible to reduce power consumption by separately forming an independent inner driving coil under the inner driving unit and directly driving the inner driving unit.

In addition, since the mirror surface is not formed on the inner driving unit but is formed on the stage connected to the inner driving unit by the link unit, it is possible to prevent the deformation of the mirror surface.

In addition, since the link unit is connected to the inner driving unit by the connection beams, it is possible to remove noise between the inner and outer driving units.

In addition, since the structure of the 2-axis driving electromagnetic scanner according to an embodiment of the present invention is simple, it is possible to easily manufacture the 2-axis driving electromagnetic scanner and reduce the size of the 2-axis driving electromagnetic scanner.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An electromagnetic scanner comprising:
   an outer driving unit which is rotatable around a first axis;
   an inner driving unit which is suspended from the outer driving unit and is rotatable around a second axis perpendicular to the first axis; and
   a stage which is located on an upper surface of the inner driving unit, such that it is rotatable together with the inner driving unit,
   wherein the stage is connected to the inner driving unit by a link unit protruding from a center of a lower surface of the stage.

2. The electromagnetic scanner of claim 1, further comprising:
   an outer driving coil which is located under a lower surface of the outer driving unit, which receives a first signal, for rotating the outer driving unit around the first axis; and
   an inner driving coil which is located under a lower surface of the inner driving unit, which receives a second signal, for rotating the inner driving unit around the second axis.

3. The electromagnetic scanner of claim 2, wherein a low frequency non-resonant signal is applied to the outer driving coil, and a high frequency resonant signal is applied to the inner driving coil.

4. The electromagnetic scanner of claim 3, wherein the low frequency non-resonant signal is a sawtooth signal, and the high frequency resonant signal is a sinusoidal signal.

5. The electromagnetic scanner of claim 1, further comprising a frame rotatably supporting the outer driving unit.

6. The electromagnetic scanner of claim 5, wherein the outer driving unit is suspended from the frame by first torsion springs extending in the first axis direction.

7. The electromagnetic scanner of claim 6, wherein the inner driving unit is suspended in the outer driving unit by second torsion springs extending in the second axis direction.

8. The electromagnetic scanner of claim 1, wherein the outer and inner driving units are ring-shaped.

9. The electromagnetic scanner of claim 8, wherein the link unit is connected to the inner driving unit by connection beams.

10. The electromagnetic scanner of claim 9, wherein the connection beams connect a lower part of the link unit to an inner surface of the inner driving unit.

11. The electromagnetic scanner of claim 10, wherein the connection beams are mechanical filter springs.

12. The electromagnetic scanner of claim 9, wherein the connection beams are formed in parallel with the first axis direction.

13. The electromagnetic scanner of claim 8, wherein the link unit has a circular cross-sectional area.

14. The electromagnetic scanner of claim 13, further comprising protrusion units formed along two sides of the link unit in a butterfly formation.

15. The electromagnetic scanner of claim 8, further comprising grooves formed along upper surfaces of the outer and inner driving units.

16. The electromagnetic scanner of claim 1, further comprising a mirror surface formed on an upper surface of the stage.

* * * * *